US010262281B1

(12) United States Patent
Vitek et al.

(10) Patent No.: US 10,262,281 B1
(45) Date of Patent: Apr. 16, 2019

(54) METHOD AND SYSTEM FOR CENTRALIZED ORDER STATUS TRACKING IN A DECENTRALIZED ORDERING SYSTEM

(75) Inventors: James G. Vitek, Ann Arbor, MI (US); David W. Haubenstricker, Pinckney, MI (US); Eric R. Sweetland, Westland, MI (US); Timothy J. Wise, Brighton, MI (US)

(73) Assignee: Domino's IP Holder LLC, Ann Arbor, MI (US)

( * ) Notice: Subject to any disclaimer, the term of this patent is extended or adjusted under 35 U.S.C. 154(b) by 678 days.

(21) Appl. No.: 11/760,980

(22) Filed: Jun. 11, 2007

(51) Int. Cl.
G06Q 10/00 (2012.01)
G06Q 10/06 (2012.01)

(52) U.S. Cl.
CPC . G06Q 10/063114 (2013.01); G06Q 10/0639 (2013.01)

(58) Field of Classification Search
CPC ............... G06Q 10/063114; G06Q 10/0639
USPC ............................................................ 705/8
See application file for complete search history.

(56) References Cited

U.S. PATENT DOCUMENTS 5,991,739 A * 11/1999 Cupps et al. ............. 705/26.8
6,070,142 A * 5/2000 McDonough et al. ........ 705/7
6,151,582 A * 11/2000 Huang et al. ................. 705/8
6,974,928 B2 * 12/2005 Bloom ......................... 209/583
7,003,474 B2 * 2/2006 Lidow ........................... 705/7
7,119,716 B2 * 10/2006 Horstemeyer .............. 340/994
7,188,071 B2 3/2007 Banerjee et al.
7,359,871 B1 * 4/2008 Paasche et al. .............. 705/26
7,376,600 B1 * 5/2008 Wadawadigi et al. ........ 705/28
2002/0035617 A1 * 3/2002 Lynch et al. ................ 709/219
2003/0061120 A1 * 3/2003 Shibuya et al. ............. 705/26
2004/0011866 A1 * 1/2004 Saad .......................... 235/380
2004/0210621 A1 * 10/2004 Antonellis ................... 709/200
2004/0243664 A1 * 12/2004 Horstemeyer .............. 709/200
2005/0004843 A1 * 1/2005 Heflin ......................... 705/15
2005/0075914 A1 * 4/2005 Bayne ........................... 705/7

(Continued)

OTHER PUBLICATIONS

"Information Sharing in a Supply Chain" HL Lee, S Whang—International Journal of Technology Management, 2000—Citeseer.*

(Continued)

Primary Examiner — Jonathan G Sterrett
(74) Attorney, Agent, or Firm — Haley Guiliano LLP; Jeffrey H. Ingerman

(57) ABSTRACT

A decentralized ordering system allows a customer to track order status from a centralized order status system by providing a single, easily remembered identifier (such as a telephone number) without having to log in and without having to specify which local system is handling the customer's order. The central system communicates with each local system to obtain order status information. The central communication function handles all login and authentication requirements on the local systems, if necessary, and reformats the order status data, if necessary, to a common format for storage at the central location. The system also may notify the customer, via telephone, text message, instant message or electronic mail, whenever the order status changes or when the order status changes to a predetermined condition (such as "out for delivery").

31 Claims, 3 Drawing Sheets

(56) References Cited

U.S. PATENT DOCUMENTS

| | | | |
|---|---|---|---|
| 2005/0250440 A1* | 11/2005 | Zhou et al. | 455/12.1 |
| 2006/0010037 A1* | 1/2006 | Angert et al. | 705/15 |
| 2006/0155770 A1* | 7/2006 | Asher et al. | 707/104.1 |
| 2007/0040026 A1* | 2/2007 | Vleet et al. | 235/383 |
| 2008/0040233 A1* | 2/2008 | Wildman et al. | 705/26 |
| 2008/0186166 A1* | 8/2008 | Zhou et al. | 340/539.13 |
| 2009/0192854 A1* | 7/2009 | Pietrucha et al. | 705/7 |
| 2009/0307096 A1* | 12/2009 | Antonellis | 705/15 |
| 2012/0179584 A1* | 7/2012 | Woycik et al. | 705/27.1 |

OTHER PUBLICATIONS

E-services: operating strategy—a case study and a method for analyzing operational benefits [PDF] from liu.seKK Boyer, R Hallowell . . . —Journal of Operations Management, 2002—Elsevier.*

Object Design Document—Version 1 Pizza Restaurant Management System B Payne, G Altun, C Davis, N Trivedi, R Trivedi , Spring 2002—pwas.googlecode.com.*

Executive restaurant order system AT Norshahril—2005—umpir.ump.edu.my.*

Pervasive computing puts food on the table V Stanford—Pervasive Computing, IEEE, 2003—ieeexplore.ieee.org.*

The Evolution and History of Supply Chain Management retrieved from the web on Jul. 6, 2015 at: http://cerasis.com/2015/01/23/history-of-supply-chain-management/.*

IP address Wikipedia, retrieved from the web at https://en.wikipedia.org/wiki/IP_address on Aug. 10, 2017.*

Storing and querying XML data using denormalized relational databases A Balmin, Y Papakonstantinou—The VLDB Journal, 2005—Springer (Year: 2005).*

\* cited by examiner

METHOD AND SYSTEM FOR CENTRALIZED ORDER STATUS TRACKING IN A DECENTRALIZED ORDERING SYSTEM

BACKGROUND OF THE INVENTION

The present invention relates to order status tracking. More particularly, this invention relates centralized order tracking in a decentralized ordering system.

Systems which allow customers to track the status of retail orders placed for delivery are known. For example, retail orders placed at a web site on the Internet can be tracked by providing, to an order status function on that web site, an order number or similar identifier assigned when the order was placed. A telephone inquiry, in which that identifier is entered via touch tones, also may be possible. In some cases, it may be possible for the purchaser to establish an account on the web site, allowing tracking of orders by logging in to one's account. In addition, orders placed with the operator of the web site through other channels, such as by telephone, or in person at retail stores also operated by the operator of the web site, also may be able to be tracked by logging in.

In systems in which orders are placed at decentralized locations, centralized order status checking is more difficult, because the order information may not be available in a central location. The problem may be complicated by multiple operational systems, even at a single location. Where such systems are known, the customer usually must enter several different items of information beyond the order identifier, such as an identification of the location at which the order was placed. Alternatively, order status can be obtained in such situations only when the customer has an account to which he or she logs in.

It would be desirable to be able to provide a system in which an order can be placed at decentralized order acceptance points—either in person at retail locations, or by telephone to such locations—and the status of that order can be checked by the customer at a centralized point—either by telephone, via the Internet, or both.

SUMMARY OF THE INVENTION

The present invention is directed to an order tracking system that allows a customer to place an order to be filled by an individual decentralized order fulfillment location, which may have multiple operational systems, while still being able to track the order without logging into the system and without having to specify which of the decentralized fulfillment locations, or which of multiple operational systems (if present) at a location, is processing the order. Preferably, the customer need specify only a single identifier provided at the time the order was placed.

The invention will be described below in the context of a retail restaurant delivery operation, but can be used in any retail environment in which orders are placed at multiple different locations but tracking at a central location is desired.

Thus, in accordance with the present invention there is provided a method for tracking from a central location status of an order being processed at one of a plurality of decentralized order fulfillment locations. The method includes maintaining at each of the decentralized order fulfillment locations a set of data for each order being processed, where the set of data includes status data and at least one identifier associated with a customer. Each of the decentralized order fulfillment locations and the central location communicate periodically to transfer each of the sets of data to the central location. A database of the sets of data is maintained at the central location. A status inquiry is accepted at the central location from the customer, with the status inquiry including the identifier. Order data are retrieved from the database in response to that status inquiry, based only on the identifier.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
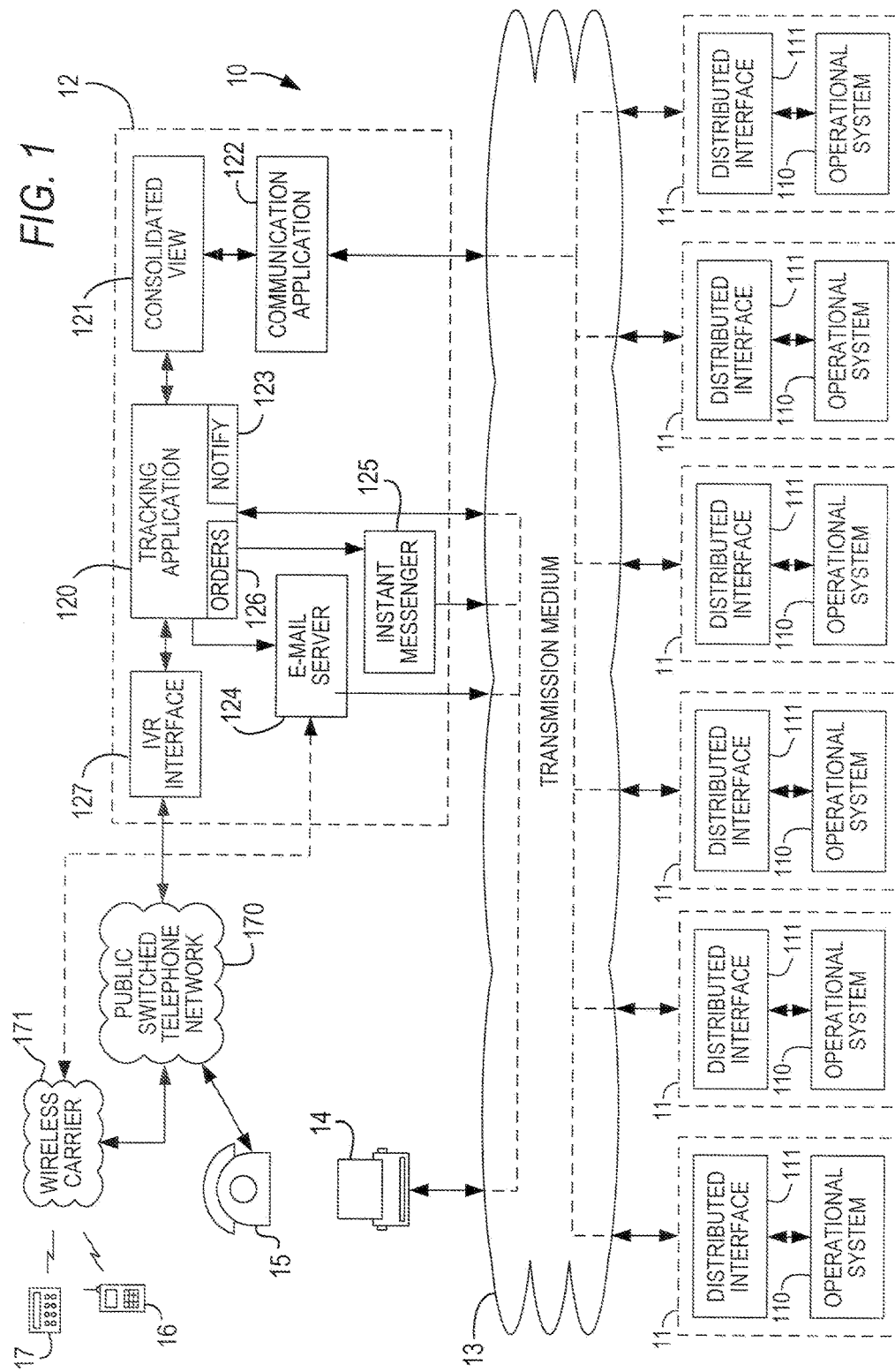
FIG. 1 is a graphical representation of a preferred embodiment of a system according to the present invention.

The present invention is directed to a system that allows a customer to track the status of his or her order in a decentralized order fulfillment system without having to specify (if he or she even knows) which location, or which system within a location, is processing the order.

Considering the example of a restaurant delivery operation, such as a chain of restaurants (e.g., pizzerias), the restaurants in the chain may be known to customers by a single name, but may be independently owned and operated (e.g., under franchise agreements). Customers may deal with their local restaurant location in placing orders, but the local location may not have the staffing resources necessary to field order status inquiries. In such an arrangement, the chain operator (e.g., the franchisor) may consider it desirable, from a customer relations perspective, to provide an easy way for customers to track their delivery orders at a central location easily identifiable by the customers, such as a World Wide Web site or an easily-remembered telephone number (preferably toll-free), or both.

Continuing with the example of a retail pizzeria chain, customers may routinely place orders with individual restaurants in the chain. These orders could be placed in person, but typically are placed by telephone and the customer may leave his or her telephone number in leaving the order, or the telephone number from which the customer is calling may be determined by the restaurant using either CallerID or Automatic Number Identification ("ANI"). Thus, the restaurant already has a single identifier which is typically unique to that customer.

The invention contemplates that the restaurant maintains a system or systems that, for internal purposes, track each order. Thus, in the pizzeria example, the restaurant may keep track of where in the process of preparation and delivery a particular order is. A particular order may be awaiting preparation, may be in the process of preparation, may be in the oven, may be awaiting packaging for delivery, may be packaged and awaiting delivery, or may be on a delivery vehicle en route to the customer. The order also may be in any other status category that the restaurant may choose to track. Within the restaurant, the order may be under the control of one of a plurality of systems, but preferably, if there is more than one system, there is a master system within the restaurant that keeps track of all orders by communicating with that plurality of systems.

In accordance with the invention, in such a restaurant chain, a central system and the master systems at individual restaurants communicate periodically to transfer order status information to the central system. Preferably, for each restaurant with which it communicates, the central system is aware of the type of system at each individual restaurant and has a suitable interface for communicating with each type of system that may be present at an individual restaurant. In a particularly preferred embodiment, the chain operator (e.g., the franchisor) mandates the type of system that should be used in an individual restaurant, so that the number of different systems with which the central system needs to be able to communicate is small. Indeed, in a most particularly preferred embodiment, there may be only one type of system.

To track an order, the customer preferably navigates to a web site associated with the restaurant chain, which is easily identifiable. The customer need not learn the address (i.e., URL) of an individual restaurant in the chain—indeed, ordinarily few if any of the individual restaurants would be expected to have their own publicly-accessible web sites. The customer then enters preferably a single unique identifier, which may be his or her telephone number, to recall the status of his or her order or orders. The status would then be displayed to the customer.

Alternatively or additionally, an order status inquiry telephone number may be provided. Preferably, such a telephone would be a toll-free number, such as a "1-800" number in the United States or a "0800" number in many other countries. The customer, on dialing such a number, would be prompted by an interactive voice response (IVR) system to enter an identifier via DTMF tones (i.e., "Touch Tones") and the order status would then be communicated aurally to the customer, preferably using prerecorded or synthesized speech, or a combination of the two.

Where both the web site and telephone inquiry routes are provided, preferably the same easily remembered single identifier is used in both routes. This is the simplest implementation insofar as both routes preferably access the same database.

As described, this system frees the customer from having to contact the individual restaurant location for order status information. In addition to the ease of remembering a single, preferably easily remembered URL or telephone number, and a single easily remembered order identifier, this system has several additional advantages.

First, the system frees personnel at the individual locations from having to respond to order status inquiries.

Second, the customer may not, in fact, know which local restaurant location is processing the order, and so could not make a status inquiry to that location. This is because the system may, as an optional additional feature, allow customers to place orders as well as obtain order status information. Thus, in a web site embodiment (or the web site function of a combined web site and telephone embodiment), the user can enter the order information on an online form or by clicking on on-screen selections, and the system, based on the delivery address or telephone number provided by the customer (the latter may be less desirable because a mobile telephone, not linked to a particular location, may be provided by the customer as the contact telephone), will route the order to the location closest to the delivery location (or perhaps to a less busy, if slightly further, location when the closest location is very busy). Similarly, in a telephone embodiment (or the telephone function of a combined web site and telephone embodiment), the system may allow the user to call one easily-remembered central telephone number (which may be a toll-free number) and it may then redirect the customer's call to the telephone of the restaurant location nearest the delivery location (or perhaps to a less busy, if slightly further, location when the closest location is very busy), where the order may be taken by a staff member. The location could be determined from the calling telephone number using CallerID or ANI as described above, or the customer could be asked to key in the telephone number of a delivery location. The latter option is particularly useful because the order may be placed from a telephone other than that of the delivery location (esp. from a mobile telephone). In either the web site ordering embodiment or the central telephone number ordering embodiment, then, the customer may not know with certainty which local restaurant location is servicing the order.

In a further embodiment, a system according to the invention may send one or more notification messages to the customer regarding the status of the order. These status notification messages may be sent by electronic mail, instant message, alphanumeric page, or mobile text message (using the Short Message Service protocol or a similar protocol). Alternatively, the status notification message can be sent to a designated telephone number and spoken using recorded or synthesized speech. Preferably, the user is given a choice of transmission mode, and is asked for the relevant address—i.e., an electronic mail address, an instant message screen name, a mobile telephone number for SMS messaging, a pager number for an alphanumeric page, or a telephone number (landline or mobile) for a spoken message.

According to one alternative, a notification message may be sent (if the user has elected to receive notification and provided an address for notification) when the order is being sent for delivery. According to another alternative, a notification message may be sent whenever the order status changes—e.g., "pizza being made," "pizza in oven," "pizza being packaged for delivery," and "pizza on delivery vehicle." Under the either alternative, the customer may be given an option to select whether or not to receive notifications and, under the latter alternative, which of the several notifications to receive.

In a web site embodiment, this can be done by allowing the user to check off which, if any, notifications he or she would like to receive. The opportunity to make those choices could be presented to the customer when an order is placed, if the system has an order-placing function. That opportunity also could be presented to the customer when the order status checking function is invoked and notifications have not previously been set up. And even if notifications have been set up, the customer may be offered the opportunity to cancel or change those notifications.

In a telephone embodiment, instructions regarding notifications can be taken by the staff member who takes the customer's order. Alternatively, in a system where the customer calls a central telephone number and is transferred to the local restaurant, before the customer's telephone call is transferred to the restaurant, the customer could be asked to choose, using DTMF tones via an IVR menu, whether to receive no notifications, all notifications, or some subset of notifications. If the user chooses the latter choice, a further IVR menu would be presented to allow the customer to specify which notifications are desired. According to another alternative, the customer could be presented with the opportunity, when he or she calls the telephonic order status system, to set up notifications, if notifications have not previously been set up. And again, even if notifications have been set up, the customer may be offered the opportunity to cancel or change those notifications.

The invention will now be described with reference to FIGS. 1-3.

FIG. 1 shows one preferred embodiment of a system in accordance with the present invention, for tracking orders that are being fulfilled by a plurality of individual decentralized locations 11. In the pizza restaurant chain example described above, each location 11 may be an individual pizzeria. Each location 11 may receive orders directly, via direct telephone or personal contact (not shown) with customers, via direct data contact (not shown) with customers via the Internet or other data network, or via system 10 as discussed above and further below. Those orders preferably are tracked, within each location 11, by a respective operational system 110, which runs on a suitable computer or server and preferably performs other location-management functions as well, including inventory management, point-of-sale operations, ledger accounting, etc.

At the other end is central location 12, which houses tracking application 120, which is the user interface for accepting user inquiries and providing responses thereto, and which preferably runs on a suitable computer or server. Individual locations 11 and central location 12 preferably communicate via a transmission medium 13, which preferably is the Internet. Preferably, those Internet communications take place using Hypertext Transport Protocol (HTTP), utilizing the Internet functionality commonly referred to as the World Wide Web.

Individual operational systems 110 may be identical to one another, particularly in a franchising environment in which the franchisor dictates the hardware and software for each system 110. However, even in such a system, there may be differences in versions from one system 110 to the next, particularly where individual franchisees are awaiting installation of the most recent upgrades while other franchisees have already received their upgrades. In order for tracking application 120 to communicate with individual operational systems 110, it must know which system 110 is which. In addition, for security, each system 110 preferably requires secure login and authentication before allowing access, particularly when access is provided via the Internet, but preferably even when a private network is used.

Accordingly, a distributed interface 111 preferably is associated with each restaurant or other location 11. Distributed interface 111 preferably converts data from the format used by operational system 110 to a standard format used by tracking application 120. That standard format may be a generic format such as XML or may be a proprietary format. Because each operational system 110 may be different as discussed above, there preferably is one distributed interface 111 for each operational system 110. Distributed interface 111 may be hardware, but preferably is software, running on a suitable computer or server. In particular, because locations 11 preferably communicate via the World Wide Web, interface 111 preferably is a web service. Although each distributed interface 111 is shown as being located at location 11 which is its preferred location, some or all of the distributed interfaces 111 may be located at location 12, particularly where distributed interface 111 is software (as is preferred) rather than hardware.

Functionally, the purpose of distributed interface 111, in addition to the translation function just described, preferably is to respond, in a polling embodiment (see below), to a request from tracking application 120 for data on any orders that have changed since a specified time, or to send such data, in a "push" embodiment (see below), on a predetermined schedule or on the occurrence of a trigger event (such as the creation of a certain number of new order or the occurrence of a certain number of changes in order status, or a combination thereof). For security, distributed interface 111 may be designed to allow communication from only one or a limited number of other locations. In a World Wide Web embodiment as described above, that limitation could be a limitation to communications from only a single or limited number of Uniform Resource Locators (URLs). Interface 111 also may require login and authentication even by the systems at location 12 before it will respond to any request in a polling embodiment. Similarly, in a "push" embodiment, interface 111 could be required to properly log into, and authenticate itself to, central system 12 before any data can be transferred.

In order to prevent disruption of operational systems 110 by customer order status queries, operational systems 110 preferably are insulated from tracking application 120 by consolidated view application 121 and communication application 122, each of which preferably is software, preferably running on a suitable computer or server. Consolidated view application 121 and communication application 122 may run on the same or different computer or server. In addition to preventing customer queries from interfering with operational systems 110, the insulation of operational systems 110 from tracking application 120 by consolidated view application 121 also prevents degraded performance of tracking application 120 (or of consolidated view application 121 itself) from affecting operational systems 110.

Consolidated view application 121 provides a system to store the order status data consolidated from the various operational systems 110, and provides communications services allowing access to, and modifications of, that data. Again, because communications preferably occur via the World Wide Web, consolidated view application 121 preferably is a web service. This application or web service 121 preferably is associated with memory (such as a bank of magnetic or optical disk drives, not shown) which preferably functions as the primary data store for the consolidated order status data. And it preferably is ultimately the place from which customers, using tracking application 120, retrieve their order status data.

Consolidated view application 121 preferably supports two primary functions. The first of those functions is the ability to add status data regarding new orders or to update status information regarding existing orders. The second of those functions is the ability to retrieve order status information preferably using as few as one of (a) a customer's telephone number (or other customer specific information), and (b) an order identifier.

Consolidated view application 121 preferably handles login and authentication to the operational systems 110, which, because they preferably are connected to the Internet (or other transmission medium 13), preferably are secured with password/authentication protection. To the extent that customers need to log in at all (and preferably they do not), they need to log into only the one consolidated view application 121. Consolidated view application 121 preferably uses it own credentials when retrieving data from operational systems 110.

Preferably, communication application 122 keeps the data in consolidated view application 121 current. Communication application 122 preferably polls each operation system periodically to obtain data on any order that has changed since the last polling. Preferably, polling of each respective operational system 110 begins at opening time of the respective location 11 and is repeated at a predetermined interval until closing time of respective location 11. This may be based on the preferred embodiment of a pizza or other food delivery operation where orders are expected to be delivered in same business day in which they are placed. However, in other businesses, polling may occur twenty-four hours per day. The polling interval preferably depends on several factors, including the statistically-determined frequency of order status changes, customer expectations for timely updates, and the impact of polling on operational systems 110 and on transmission medium 13.

Preferably, the response to a polling request is a list of all orders for which data has changed since the last polling request. This preferably includes both new orders and previously existing orders that now have a different status. Preferably, data for both types of orders is sent the same way—i.e., as a complete order status record. Thus, consolidated view application 121 preferably can treat both types of orders the same way—i.e., by simply storing the complete record. In the case of an updated record for a previously existing order, the complete updated record preferably is substituted for the previous record for that order. That eliminates the need to open and modify the previously existing record.

Although communication application 122 has been described in the context of polling of individual locations 11 by central location 12, it also is possible in a "push" embodiment for each individual location 11 to be programmed to initiate communication periodically, starting at opening time of that location, with communication application 122 at central location 12. As discussed above, individual location 11 could communicate at predetermined regular intervals, and/or on the occurrence of certain trigger events. For example, individual location 11 might be programmed wait for the next scheduled communication regardless of the number of events to report, or it might not have a schedule and instead might be programmed to initiate a new communication once it has accumulated a certain number (which could be as low as "1," and preferably is programmable) of new orders or status changes. As another alternative, individual location 11 could communication on a schedule, but if, within a certain small time period just after a scheduled communication, a large number of reportable events occur, it might be programmed to initiate communication immediately, rather than waiting for the next scheduled communication.

As discussed above, tracking application 120 preferably operates relatively simply. A customer preferably accesses tracking application 120 using computer 14 via transmission medium 13. Insofar as transmission medium 13 preferably is the Internet, customer computer 14 preferably needs no software other than a standard web browser. Tracking application 120 preferably prompts the customer for the single identifier discussed above (e.g., telephone number), uses that identifier to send a request to consolidated view application 121. Consolidated view application 121 preferably returns a list of one or more orders, which tracking application 120 preferably then displays to the customer. The customer then selects the correct order, whereupon tracking application 120 submits a further request for the order status details, which are returned by consolidated view application 121 and displayed to the customer. In an alternative embodiment, if the list of orders matching the customer identifier includes only one order, the list display and customer selection steps may be eliminated and the order status information may be displayed directly.

Figure 2:
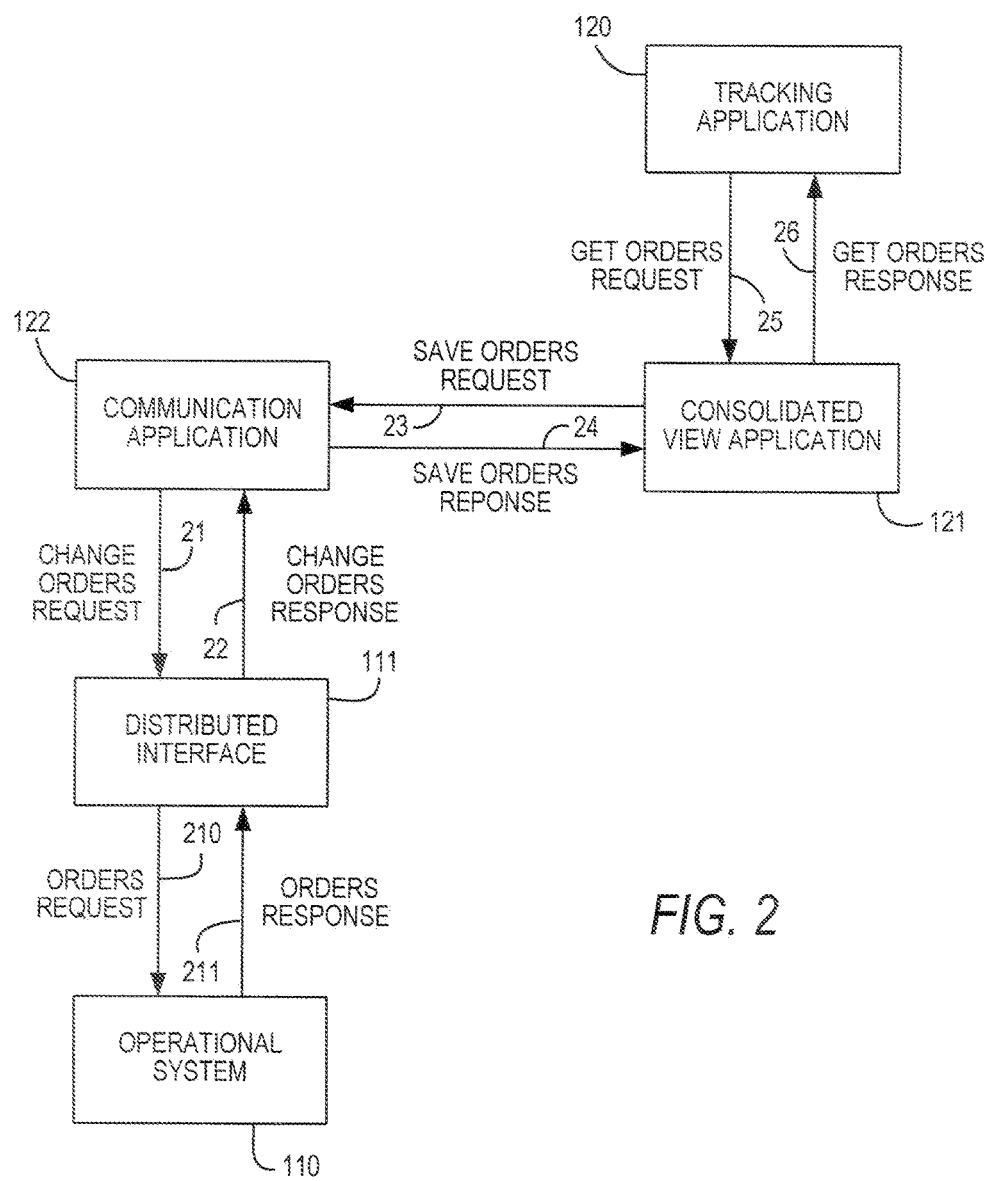
FIG. 2 is a graphical representation of a preferred embodiment of data flow in a system such as that of FIG. 1.

A preferred embodiment of the flow of information in a polling embodiment of system 10 is shown in FIG. 2 which, for ease of illustration, shows only one location 11. Because there is no information in system 10 that is usable by tracking application 120 until communication application 122 asks for it, it is most useful to start with Changed Orders Request 21, which is sent periodically (as discussed above) by communication application 122 to the respective distributed interface 111 associated with each operational system 110.

As previously discussed, transmission medium 13 preferably is the Internet and distributed interface 111 is a web service, with each distributed web service having its own URL. Changed Orders Request 21 preferably is sent via HTTP to that URL. The body of the request preferably is an XML formatted message. One data element in the message is a date/time, which may be referred to as the "since time." The message requests information regarding all orders being handled by operational system 111 whose status has changed since the "since time." Additional data elements that may be included are a username and password for authenticating the request (i.e., to authenticate that consolidated view application 121 is authorized to seek the data—the customer preferably need not log in, as previously discussed), and a version designator which can be used to specify the format in which the data should be reported if multiple formats are supported. Below is an example of such a request as an XML formatted message:

```
<soap:Envelope xmlns:soap="http://schemas.xmlsoap.org/soap/envelope/"
   xmlns:xsd="http://www.w3.org/2001/XMLSchema"
   xmlns:xsi="http://www.w3.org/2001/XMLSchema-instance">
   <soap:Header>
      <Authorization xmlns="http://www.dominos.com/message/">
         <User>SampleUser</User>
         <Password>PleaseApproveMe</Password>
      </Authorization>
   </soap:Header>
   <soap:Body>
      <GetLiveDataChangesSince xmlns="http://www.dominos.com/message/">
         <Version>1.0</Version>
         <Since>2007-03-07T06:00:00</Since>
      </GetLiveDataChangesSince>
   </soap:Body>
</soap:Envelope>
```

Upon receipt of Changed Orders Request 21, distributed interface 111 preferably queries operational system 110 at 210 for orders that have changed since the since time, and receives a reply at 211. The actual implementation of Orders Request 210 and Orders Response 211 may vary depending on operational system 110. Preferably, however, changes that result in no discernible changes to be displayed to the customer are not included in Orders Response 211. Upon receipt of Orders Response 211, distributed interface 111 preferably constructs and returns a Changed Orders Response 22 to communication application 122.

Changed Orders Response 22 preferably includes a version number that indicates what version operational system 110 is running under so that consolidated view application 121 can consolidate the data appropriately, an operational system identifier to identify which operational system 110 these data are from, and an "as of" date/time which will be used in the next request to this particular operational system 110. Preferably, each set of status data for a particular order completely replaces any existing data for that order in consolidated view application 121 so that editing is not required. Therefore, if there is any change in the status of an order, preferably a complete copy of that order is returned if any there is any indication of change. Changed Orders Response 22 preferably also includes an order identifier to allow the order to be uniquely identified within the context of all orders for this particular operational system 110 and which preferably does not change over time, a "last modified" time so that the customer will know when the status was last updated, any customer order lookup based on telephone number as well as postal and/or electronic mail addresses, etc., a description of the order, the current status of the order, and any other information that a customer may want to see. Below is an example of a Changed Orders Response 22 returning a single order:

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema">
    <soap:Body>
        <GetLiveDataChangesSinceResponse xmlns="http://www.dominos.com/message/">
            <Version>1.0</Version>
            <OperationalSystem>aa.dominos.com</OperationalSystem>
            <AsOf>2007-03-06T14:55:31</AsOf>
            <Orders>
                <Order>
                    <OrderID>123</OrderID>
                    <LastModified>2007-03-06T14:55:31</LastModified>
                    <Phone>7349303030</Phone>
                    <Status>In Oven</Status>
                    <Description>Large Pepperoni Pizza</Description>
                </Order>
            </Order>
        </GetLiveDataChangesSinceResponse>
    </soap:Body>
</soap:Envelope>
```

After receiving Changed Orders Response 22 from distributed interface 111, communication application 122 preferably sends a Save Order Changes Request 23 to consolidated view application 121. This request may be similar to Changed Orders Response 22, with the preferred addition of authentication information such as a username and password:

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema">
    <soap:Header>
        <Authorization xmlns="http://www.dominos.com/message/">
            <User>SampleUser</User>
            <Password>PleaseApproveMe</Password>
        </Authorization>
    </soap:Header>
    <soap:Body>
        <SaveOrderChanges xmlns="http://www.dominos.com/message/">
            <Version>1.0</Version>
            <OperationalSystem>aa.dominos.com</OperationalSystem>
            <AsOf>2007-03-06T14:55:31</AsOf>
            <Orders>
                <Order>
                    <OrderID>123</OrderID>
                    <LastModified>2007-03-06T14:55:31</LastModified>
                    <Phone>7349303030</Phone>
                    <Status>In Oven</Status>
                    <Description>Large Pepperoni Pizza</Description>
                </Order>
            </Order>
        </SaveOrderChanges>
    </soap:Body>
</soap:Envelope>
```

In processing this request 23, consolidated view application 121 preferably first confirms that request 23 has the appropriate authentication credentials. Then the version data element is consulted to determine if older formats need to be transformed into the "current" format. Then each order in request 23 is placed into a storage system, such as a database (which may reside on any suitable storage mechanism such as a magnetic or optical drive, or nonvolatile semiconductor memory). The stored data preferably is indexed to facilitate later searching and retrieval or specific orders for which customer inquiries may be received. Because each order returned preferably contains all data elements as discussed above, there is no need to "merge" the new data with old data, if any, previously saved for that order. Instead, the data record for that order is simply overwritten with the new record.

The response to Save Order Changes Request 23 need not be much more than an acknowledgement. In the example below, the Save Order Changes Response 24 also returns the number of orders that were in the original request (if that number does not match the number of orders that in fact were in the original request, communication application 122 can send an error message to consolidated view application 121 and error-handling procedures can be initiated):

```
<soap:Envelope xmlns:soap="http://schemas.xmlsoap.org/soap/envelope/"
    xmlns:xsd="http://www.w3.org/2001/XMLSchema"
    xmlns:xsi="http://www.w3.org/2001/XMLSchema-instance">
    <soap:Body>
        <SaveOrderChangesResponse xmlns="http://www.dominos.com/message/">
            <Version>1.0</Version>
            <OrdersSavedCount>2</OrdersSavedCount>
        </SaveOrderChangesResponse>
    </soap:Body>
</soap:Envelope>
```

Once the data are in consolidated view application 121, it is ready to process customer inquiries received via tracking application 120. Such a request causes tracking application 120 to generate a Get Orders Request 25. Get Orders Request 25 needs to contain only enough information for consolidated view application 121 to search for orders that match the given criteria. In example below, there is a standard authentication username and password, a version designation, and a telephone number which is the search criterion that is to be used to search for a customer's order or orders. As discussed above, any other easily-remembered identifier collected when the order is taken may be used by the system instead of telephone number.

```
<soap:Envelope xmlns:soap="http://schemas.xmlsoap.org/soap/envelope/"
```

```
xmlns:xsd="http://www.w3.org/2001/XMLSchema"
xmlns:xsi="http://www.w3.org/2001/XMLSchema-in-
    stance">
<soap:Header>
    <Authorization    xmlns="http://www.dominos.com/
        message/">
        <User>PatentOffice</User>
        <Password>PleaseApproveMe</Password>
    </Authorization>
</soap:Header>
<soap:Body>
    <GetOrders    xmlns="http://www.dominos.com/mes-
        sage/">
        <Version>1.0</Version>
        <Phone>7349303030</Phone>
    </GetOrders>
</soap:Body>
</soap:Envelope>
```

In processing Get Orders Request 25, consolidated view application 121 preferably first confirms that the request has the appropriate authentication credentials. Then the version data element is consulted to determine if the requested format is supported—if not an error result is returned. Otherwise, the search criterion, such as the telephone number, is used to find matching orders, if any. The orders are then formatted into a Get Orders Response 26. If there are no orders that match the search criterion, then preferably Get Orders Response 26 is still returned with no orders. Below is an example of Get Orders Response 26 with a single order in it.

```
<soap:Envelope  xmlns:soap="http://schemas.xmlsoap.org/
    soap/envelope/"
    xmlns:xsd="http://www.w3.org/2001/XMLSchema"
    xmlns:xsi="http://www.w3.org/2001/XMLSchema-in-
        stance">
    <soap:Body>
        <GetOrdersResponse    xmlns="http://www.dom-
            inos.com/message/">
            <Version>1.0</Version>
            <Orders>
                <Order>
                    <OperationalSystem>aa.dominos.com</Opera-
                        tionalSystem>
                    <OrderID>123</OrderID>
                    <LastModified>2007-03-06T14:55:31</Last-
                        Modified>
                    <Phone>7349303030</Phone>
                    <Status>In Oven</Status>
                    <Description>Large   Pepperoni   Pizza</De-
                        scription>
                </Order>
            </Order>
        </GetOrdersResponse>
    </soap:Body>
</soap:Envelope>
```

Figure 3:
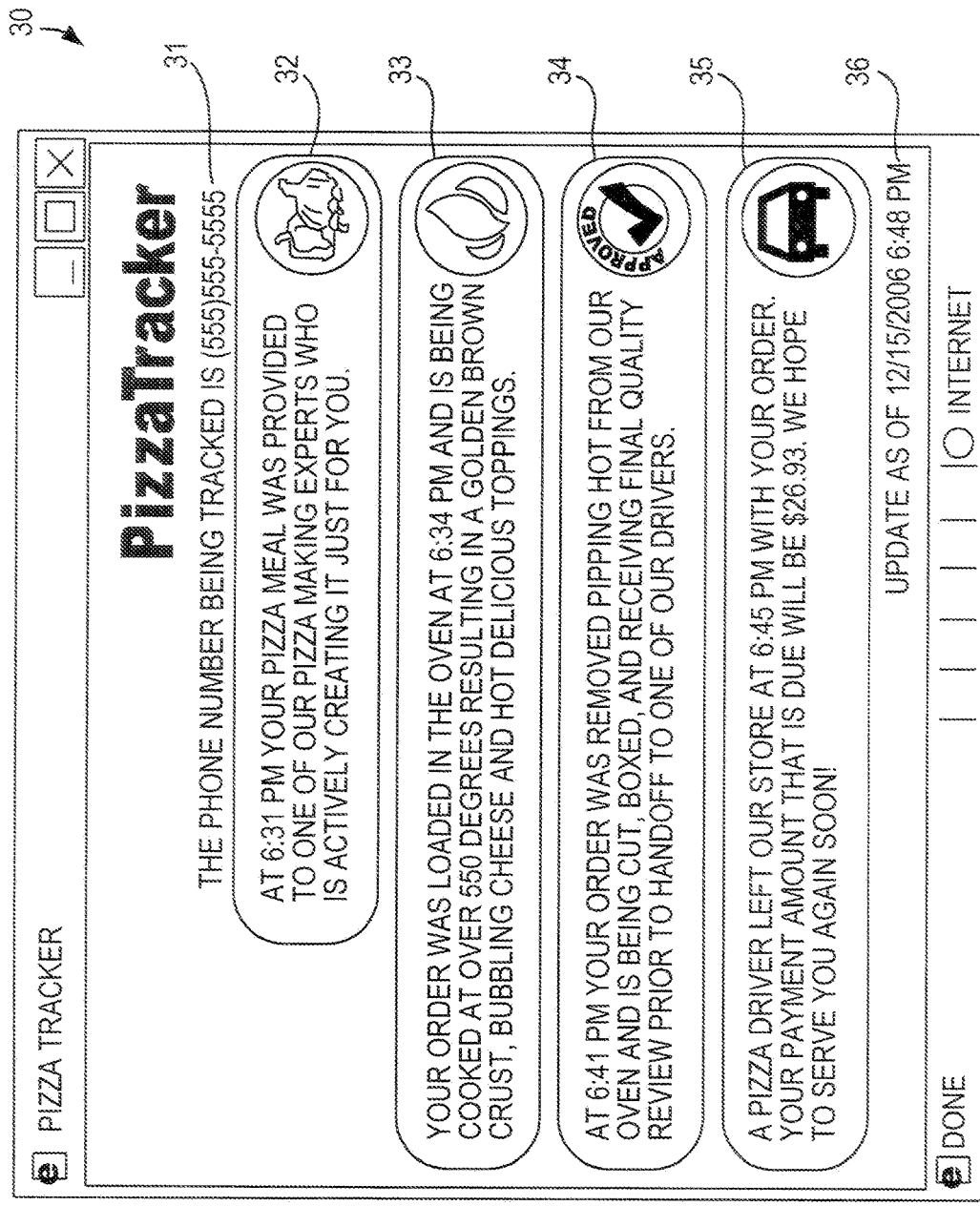
FIG. 3 is an example of a screen display of results of tracking an order in accordance with the present invention.

FIG. 3 is a an example of a screen display 30 of the order status information as sent to the customer. In this case, the order is for a pizza, which already has been sent for delivery. In this example, the information being displayed includes the customer identifier 31, which in this case is a telephone number, information 32 regarding the initiation of preparation of the pizza, information 33 regarding loading of the pizza into the oven, information 34 regarding preparation of the pizza after baking for delivery (i.e., cutting, boxing, etc.), and information 35 regarding dispatching of the pizza on a delivery vehicle. Information 35 preferably also includes a reminder to the customer of the amount to be paid (unless, e.g., the order was prepaid or charged to a credit card) to the delivery person. The time 36 as of which the displayed information is current also preferably is displayed. If, for example, the pizza were still in the oven, information 34 and information 35 would not be displayed. It would be useful for the customer to know how current that information was, which would allow the customer to assess when the status might next change.

In addition to allowing customers to use computer 14 to access order status information, system 10 may be configured to allow telephone inquiries from either landline telephone 15 or mobile telephone 16. For this purpose, system 10 may further include an interactive voice response interface 127 connected to public switch telephone network 170, which may further be connected to wireless telephone carrier 171. This allows users of landline telephone 15 or mobile telephone 16 to dial into system 10. IVR interface 127 would prompt the customer for the identifier (e.g., telephone number) to be searched, and the customer could input the identifier using DTMF tones (or by speaking the identifier if IVR interface 127 includes a voice recognition module (not shown)). Tracking application 120 preferably would then retrieve the order status information in the same way it does for an inquiry via computer 14, and would output it via IVR interface 127 using synthesized or recorded speech.

As discussed above, tracking application 120 may further include notification module 123, which outputs order status information without waiting for a customer inquiry. As discussed above, this notification information would be sent to a user via a contact method specified by the user, at the time an order is placed, for receiving notifications. Notification module 123 could send telephonic reminders, again using recorded or synthesized speech, via IVR interface 127 to landline telephone 15 or mobile telephone 16. Alternatively, the notification information may be sent to an electronic mail address or instant messaging screen name using electronic mail server 124 or instant messaging agent 125 for viewing on computer 14. Finally, a mobile text message or alphanumeric page may be send via electronic mail server 124 to mobile telephone 16 or pager 17, respectively.

As discussed above, tracking application 120 may include order-taking module 126 which would allow a customer to place an order to be relayed to appropriate individual location 11. If the order is received from a computer 14, the order details can be sent, via consolidated view application 121 and communication application 122 to operational system 110. If the order is received from landline telephone 15 or mobile telephone 16, the system could prompt the user, via IVR interface 127, for information from which appropriate location 11 could be determined, and then transfer the call to that location 11. During the order-taking process, information to be used for later order status inquiries or notifications can be collected as discussed above.

Thus it is seen that an order tracking system that allows a customer to place an order to be filled by an individual decentralized order fulfillment location, which may have multiple operational systems, while still being able to track the order without logging into the system and without having to specify which of the decentralized fulfillment locations, or which of multiple operational systems (if present) at a location, is processing the order, has been provided. One skilled in the art will appreciate that the present invention can be practiced by other than the described embodiments, which are presented for purposes of illustration and not of limitation, and the present invention is limited only by the claims which follow.

What is claimed is:

1. A method for tracking, from a central location, status of an order for a food item prepared at one of a plurality of decentralized food-preparation locations in a chain of food-service establishments for delivery to a customer at a customer location, the method comprising:

accepting, from the customer, an order for a food item at either a central computer system for the central location or an order processing computer system at any of the decentralized food-preparation locations, without requiring a login by the customer;

assigning the order for the food item to a first decentralized food-preparation location of the plurality of decentralized food-preparation locations in the chain of food-service establishments, the first decentralized food-preparation location being selected based on a respective customer attribute;

storing, in a respective order processing computer system for the first decentralized food-preparation location, status data for the order for the food item, and an identifier associated with the customer for the order and obtained during the accepting of the order, wherein the status data comprises data indicating at least one of real-time status of preparation at the first decentralized food-preparation location or real-time location of the food item prior to delivery;

communicating periodically between the central computer system at the central location and the order processing computer system for the first decentralized food-preparation location to send order status data to the central location;

accepting, at the central computer system at the central location, a status inquiry from the customer regarding the order without requiring a login by the customer and without requiring specification by the customer of the first decentralized food-preparation location, the status inquiry including the identifier associated with customer; and providing, by the central computer system at the central location, retrieved order status data to the customer, in response to the inquiry and based on the identifier associated with the customer, regardless of whether the order was accepted at the central location or at one of the plurality of decentralized food-preparation locations in the chain of food-service establishments.

2. The method of claim 1 wherein the communicating comprises polling, by the central computer system at the central location, of respective order processing computer systems at the decentralized food-preparation locations in the chain of food-service establishments.

3. The method of claim 1 wherein the communicating comprises each of the respective order processing computer systems at the decentralized food-preparation locations in the chain of food-service establishments initiating communication with the central computer system at the central location.

4. The method of claim 1 wherein providing, by the central computer system at the central location, retrieved order status data to the customer comprises reporting the retrieved order status data to the customer by one from the group of: a web page display, a telephone call, a voice message, a text message, an electronic mail message, and an instant message.

5. The method of claim 1 further comprising:
receiving, from the customer, a status notification setting; and providing, by the central computer system at the central location to the customer, order status data according to the status notification setting.

6. The method of claim 5 wherein the status notification setting comprises at least one from the group of: receiving a notification upon any change in status data, receiving a notification for predefined status data change types, and no notifications.

7. The method of claim 5 wherein the order status data is provided by one from the group of: a web page display, a telephone call, a voice message, a text message, an electronic mail message, and an instant message.

8. The method of claim 1 wherein the identifier comprises one from the group of: a telephone number, an electronic mail address, and a username.

9. The method of claim 1 wherein the customer attribute comprises the customer location.

10. The method of claim 1 wherein the customer attribute comprises a customer location preference.

11. The method of claim 1 wherein the customer attribute comprises a customer franchisee preference.

12. A system for tracking, from a central location, status of an order for a food item prepared at one of a plurality of decentralized food-preparation locations in a chain of food-service establishments for delivery to a customer at a customer location, the system comprising:

a central computer system at the central location capable of accepting an order from the customer, without requiring a login by the customer, obtaining, as part of the accepting of the order, an identifier associated with the customer for the order, and assigning the order to a first decentralized food-preparation location in the chain of food-service establishments selected based on a customer attribute;

a respective order processing computer system at each of the decentralized food-preparation locations in the chain of food-service establishments capable of accepting the order from the customer, and processing the order;

memory in each of the respective order processing computer systems at the decentralized food-preparation locations in the chain of food-service establishments capable of storing, at each respective location, status data for the order for the food item and the identifier associated with the customer for the order, wherein the status data comprises data indicating at least one of real-time status of preparation of the food item at the respective location or real-time location of the food item prior to delivery;

a respective local communication unit in each of the respective order processing computer systems at the decentralized food-preparation locations in the chain of food-service establishments;

a central communication unit in the central computer system at the central location that communicates periodically with each of the respective order processing computer systems at the decentralized food-preparation locations in the chain of food-service establishments via the respective local communication unit to transfer order status data to the central location;

a database in the central computer system at the central location storing the order status data; and an interface in the central computer system at the central location that receives a status inquiry from the customer regarding the order without requiring a login by the customer and without specifying the first decentralized food-preparation location, the status inquiry including the identifier; wherein:

the central computer system retrieves order status data from the database based only on the identifier, and provides the retrieved order status data to the customer, in response to the inquiry at the central location, regardless of whether the order was accepted from the customer at the central location or was accepted from the customer at one of the decentralized food-preparation locations in the chain of food-service establishments.

13. The system of claim 12 wherein the central communication unit includes a polling unit that polls each respective local communication unit.

14. The system of claim 12 wherein the central communication unit receives communications initiated by the respective local communication unit.

15. The system of claim 12 wherein the retrieved order status data provided to the customer comprise a report of the retrieved order status to the customer by one from the group of: a web page display, a telephone call, a voice message, a text message, an electronic mail message, and an instant message.

16. The system of claim 12 wherein the central computer system and the respective order processing systems are further capable of receiving, from the customer, a status notification setting; and providing, to the customer, order status data according to the status notification setting.

17. The system of claim 16 wherein the status notification setting comprises at least one from the group of: receiving a notification upon any change in status data, receiving a notification for predefined status data change types, and no notifications.

18. The system of claim 12 wherein the order status data is provided by the interface using one from the group of: a web page display, a telephone call, a voice message, a text message, an electronic mail message, and an instant message.

19. The system of claim 12 wherein the identifier comprises one from the group of: a telephone number, an electronic mail address, and a username.

20. The system of claim 12 wherein the customer attribute comprises the customer location.

21. The system of claim 12 wherein the customer attribute comprises a customer location preference.

22. A method for tracking, from a central location, status of an order for a food item prepared at one of a plurality of decentralized food-preparation locations in a chain of food-service establishments for delivery to a particular customer, out of a plurality of customers, at a customer location, the method comprising:

accepting, from each of the plurality of customers, a respective order for a respective food item, some of said orders being accepted at a central computer system for the central location, and others of said orders being accepted at respective order processing computer systems at respective ones of the decentralized food-preparation locations, said accepting occurring without requiring a login by any of the customers and including obtaining a respective identifier associated with each respective customer for each respective order;

assigning each respective order for the respective food item to a respective decentralized food-preparation location of the plurality of decentralized food-preparation locations in the chain of food-service establishments, the respective decentralized food-preparation location being selected based on a respective customer attribute;

storing in a respective order processing computer system for the respective decentralized food-preparation location status data for the respective order for the respective food item and the respective identifier associated with the respective customer for the respective order, wherein the status data comprises data indicating at least one of real-time status of preparation of the respective food item at the respective decentralized food-preparation location or real-time location of the food item prior to delivery;

communicating periodically between the central computer system at the central location and each respective order processing computer system for each respective decentralized food-preparation location to send order status data to the central location;

accepting, at the central computer system at the central location, a respective status inquiry from the particular customer regarding a particular respective order without requiring a login by the particular customer, the status inquiry including the respective identifier associated with the particular customer without specifying the respective decentralized food-preparation location; and providing, by the central computer system at the central location, retrieved order status data to the particular customer, in response to the inquiry and based on the identifier associated with the customer, regardless of whether the respective order was accepted at the central location or at one of the plurality of decentralized food-preparation locations in the chain of food-service establishments.

23. A system for tracking, from a central location, status of an order for a food item prepared at one of a plurality of decentralized food-preparation locations in a chain of food-service establishments for delivery to a particular customer, out of a plurality of customers, at a customer location, the system comprising:

a central computer system at the central location capable of accepting, from each of a plurality of customers, a respective order for a respective food item, including obtaining a respective identifier associated with each respective customer for each respective order without requiring a login by any customer, and assigning the respective order for the respective food item to a respective decentralized food-preparation location of the plurality of decentralized food-preparation locations in the chain of food-service establishments, the respective decentralized food-preparation location being selected based on a respective customer attribute;

a respective order processing computer system at each of the decentralized food-preparation locations in the chain of food-service establishments capable of accepting, from each of the plurality of customers, the respective order for the respective food item, wherein some of said orders are accepted at the central computer system for the central location, and others of said orders are accepted at the respective order processing computer systems at respective ones of the decentralized food-preparation locations;

memory in each of the respective order processing computer systems at the respective decentralized food-preparation locations in the chain of food-service establishments capable of storing status data for the respective order for the respective food item and a respective identifier associated with the respective customer for the respective order, wherein the status data comprises data indicating at least one of real-time status of preparation of the respective food item at the respective decentralized food-preparation location or real-time location of the food item prior to delivery;

a respective local communication unit in each of the respective order processing computer systems at the respective decentralized food-preparation locations capable of communicating periodically between the central computer system at the central location and each respective order processing computer system for each respective decentralized food-preparation location to send order status data to the central location;

a central communication unit in the central computer system at the central location that communicates periodically with each of the respective order processing computer systems at the respective decentralized food-preparation location via the respective local communication unit to transfer order status data to the central location;

a database in the central computer system at the central location storing the order status data; and an interface in the central computer system at the central location that receives a status inquiry from the particular customer regarding a particular respective order without requiring a login by the particular customer, the status inquiry including the respective identifier associated with the particular customer without specifying the respective decentralized food-preparation location, wherein the central computer system at the central location provides order status data to the particular customer, in response to the inquiry, regardless of whether the respective order was accepted at the central location or at one of the plurality of decentralized food-preparation locations in the chain of food-service establishments.

24. The system of claim 23 wherein the respective order for the respective food item is accepted from each of the plurality of customers via a respective first communication mode, and the status inquiry from the particular customer is received via a second communication mode different from the respective first communication mode.

25. The system of claim 24 wherein the first communication mode is selected from the group consisting of telephony, voice message, text message, internet web page, electronic mail message, and an instant message, and the second communication mode is selected from the group consisting of telephony, voice message, text message, internet web page, electronic mail message, and an instant message.

26. The method of claim 22 wherein the respective order for the respective food item is accepted from each of the plurality of customers via a respective first communication mode, and the status inquiry from the particular customer is received via a second communication mode different from the respective first communication mode.

27. The method of claim 26 wherein the first communication mode is selected from the group consisting of telephony, voice message, text message, internet web page, electronic mail message, and an instant message, and the second communication mode one is selected from the group consisting of telephony, voice message, text message, internet web page, electronic mail message, and an instant message.

28. The system of claim 12 wherein the order for is accepted from the customer via a first communication mode, and the status inquiry from the customer is received via a second communication mode different from the first communication mode.

29. The system of claim 28 wherein the first communication mode is selected from the group consisting of telephony, voice message, text message, internet web page, electronic mail message, and an instant message, and the second communication mode is selected from the group consisting of telephony, voice message, text message, internet web page, electronic mail message, and an instant message.

30. The method of claim 1 wherein the order for is accepted from the customer via a first communication mode, and the status inquiry from the customer is received via a second communication mode different from the first communication mode.

31. The method of claim 30 wherein the first communication mode is selected from the group consisting of telephony, voice message, text message, internet web page, electronic mail message, and an instant message, and the second communication mode is selected from the group consisting of telephony, voice message, text message, internet web page, electronic mail message, and an instant message.

* * * * *